(12) United States Patent
Byun et al.

(10) Patent No.: US 10,327,252 B2
(45) Date of Patent: Jun. 18, 2019

(54) METHOD AND APPARATUS FOR RECEIVING V2X MESSAGE

(71) Applicant: LG ELECTRONICS INC., Seoul (KR)

(72) Inventors: Daewook Byun, Seoul (KR); Jian Xu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/627,187

(22) Filed: Jun. 19, 2017

(65) Prior Publication Data

US 2017/0367098 A1 Dec. 21, 2017

Related U.S. Application Data

(60) Provisional application No. 62/352,535, filed on Jun. 20, 2016.

(51) Int. Cl.
| | |
|---|---|
| H04W 72/04 | (2009.01) |
| H04W 72/12 | (2009.01) |
| H04L 5/00 | (2006.01) |
| H04W 92/16 | (2009.01) |
| H04W 4/06 | (2009.01) |
| H04W 4/40 | (2018.01) |

(52) U.S. Cl.
CPC ....... *H04W 72/0486* (2013.01); *H04L 5/0001* (2013.01); *H04L 5/0053* (2013.01); *H04W 4/06* (2013.01); *H04W 4/40* (2018.02); *H04W 72/1252* (2013.01); *H04W 92/16* (2013.01)

(58) Field of Classification Search
CPC .................................................. H04W 72/0486
See application file for complete search history.

(56) References Cited

U.S. PATENT DOCUMENTS

| | | | | |
|---|---|---|---|---|
| 2012/0263089 | A1* | 10/2012 | Gupta | H04W 72/005 370/312 |
| 2012/0307707 | A1* | 12/2012 | Wang | H04W 72/005 370/312 |
| 2013/0294321 | A1* | 11/2013 | Wang | H04W 4/06 370/312 |
| 2015/0079979 | A1* | 3/2015 | Anchan | H04W 76/15 455/433 |
| 2016/0072665 | A1* | 3/2016 | Xia | H04L 41/0659 370/225 |

(Continued)

*Primary Examiner* — Andrew Lai
*Assistant Examiner* — Andrew C Lee
(74) *Attorney, Agent, or Firm* — Lee Hong Degerman Kang Waimey

(57) ABSTRACT

Provided are a method of receiving a vehicle to everything (V2X) message by a base station in a wireless communication system, and an apparatus supporting the method. The method may include: receiving, from a multi-cell coordination entity (MCE), local multimedia broadcast multicast service (MBMS) distribution information including an internet protocol (IP) multicast address; receiving, from the MCE, an indication indicating whether the local MBMS distribution information is allocated by a local MBMS entity (LME); and receiving the V2X message by joining the IP multicast address on the basis of the indication and the local MBMS distribution information, wherein the local MBMS distribution information is information for IP multicast distribution of MBMS user plane data.

13 Claims, 12 Drawing Sheets

(56) References Cited

U.S. PATENT DOCUMENTS

| | | | |
|---|---|---|---|
| 2016/0080163 A1* | 3/2016 | Taylor | H04L 12/189 370/312 |
| 2017/0041752 A1* | 2/2017 | Baek | H04W 4/023 |
| 2017/0086047 A1* | 3/2017 | Buckley | H04W 4/22 |
| 2017/0332309 A1* | 11/2017 | Chen | H04W 48/10 |
| 2018/0014246 A1* | 1/2018 | Chang | H04W 4/06 |

* cited by examiner (a)

(b)

METHOD AND APPARATUS FOR RECEIVING V2X MESSAGE

CROSS-REFERENCE TO RELATED APPLICATIONS

Pursuant to 35 U.S.C. § 119(e), this application claims the benefit of U.S. Provisional Patent Application No. 62/352,535, filed on Jun. 20, 2016, the contents of which are hereby incorporated by reference herein in its entirety.

BACKGROUND OF THE INVENTION

Field of the Invention

The present invention relates to a wireless communication system, and more particularly, to a method of receiving a vehicle to everything (V2X) message by a base station, and an apparatus supporting the method.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. The 3GPP LTE adopts MIMO (multiple input multiple output) having maximum four antennas. In recent years, there is an ongoing discussion on 3GPP LTE-advanced (LTE-A) that is an evolution of the 3GPP LTE.

Recently, there has been a growing interest in device-to-device (D2D) technology that enables direct communications between devices. In particular, D2D receives attention as a communication technology for public safety networks. Commercial communication networks are rapidly changing to LTE, while current public safety networks are mostly based on 2G technology due to a collision with existing communication specifications and costs. Such a gap in technology and demands for improved services result in efforts to improve public safety networks.

Public safety networks have higher service requirements (reliability and security) than commercial communications networks, and particularly requires direct signal transmission and reception between devices, that is, D2D operations, even beyond cellular communication coverage or even when cellular communication is unavailable.

D2D operations may have various advantages in terms of signal transmission and reception between adjacent devices. For example, D2D user equipments (UEs) are able to perform data communication at high transmission rate with low delay. Further, D2D operations may disperse traffic concentrated on a base station (BS) and may function to extend the coverage of a BS when a D2D UE serves as a relay.

Vehicle to everything (V2X) is a technology which adds mobility to a D2D technology to exchange or share useful information such as traffic conditions or the like by mutually communicating with road infrastructure or other vehicles persistently while a vehicle is travelling.

SUMMARY OF THE INVENTION

Meanwhile, according to a localized multimedia broadcast/multicast service (MBMS) architecture proposed to transmit a vehicle to everything (V2X) message, different V2X messages cannot be transmitted by being distributed to different areas having the same TMGI. In addition, since a broadcast multicast service center (BM-SC) does not provide information related to a local MBMS entity (LME) to an MBMS-gateway (GW), the MBMS-GW cannot know to which LME a session establishment request message is transmitted. Therefore, in the localized MBMS architecture, there is a need to newly propose a procedure for transmitting different V2X messages to different areas having the same TMGI and a procedure for providing information regarding an LME for which a session establishment procedure is to be triggered.

According to one embodiment, there is provided a method of receiving a vehicle to everything (V2X) message by a base station in a wireless communication system. The method may include: receiving, from a multi-cell coordination entity (MCE), local multimedia broadcast multicast service (MBMS) distribution information including an internet protocol (IP) multicast address; receiving, from the MCE, an indication indicating whether the local MBMS distribution information is allocated by a local MBMS entity (LME); and receiving the V2X message by joining the IP multicast address on the basis of the indication and the local MBMS distribution information, wherein the local MBMS distribution information is information for IP multicast distribution of MBMS user plane data.

The method may further include checking whether the local MBMS distribution information is allocated by the LME on the basis of the indication. The V2X message is received by joining the IP multicast address included in the local MBMS distribution information allocated by the LME when the base station checks that the local MBMS distribution information is allocated by the LME.

The indication may indicate that the local MBMS distribution information is allocated by the LME.

The IP multicast address may be an IP multicast address in the LME.

The IP multicast address may include a transport network IP multicast address and an IP address of a multicast source.

The local MBMS distribution information may be allocated by the LME on the basis of a flow identity (ID) for identifying different data. The flow ID may be transmitted from a broadcast multicast service center (BM-SC) to the LME by being included in a local distribution request message. The flow ID may be transmitted from the BM-SC to the LME only when a network provides different data to a different area by using the same TMGI.

The local MBMS distribution information may further include a common tunnel endpoint identifier (C-TEID).

The indication and the local MBMS distribution information may be received from the MCE by being included in an MBMS session start request message.

According to another embodiment of the present invention, there is provided a base station of receiving a V2X message in a wireless communication system. The base station may include: a memory; a transceiver; and a processor operatively coupled to the memory and the transceiver, wherein the processor is configured for: receiving, by the transceiver from a MCE, local MBMS distribution information including an IP multicast address; receiving, by the transceiver from the MCE, an indication indicating whether the local MBMS distribution information is allocated by an LME; and receiving, by the transceiver, the V2X message by joining the IP multicast address on the basis of the indication and the local MBMS distribution information, wherein the local MBMS distribution information is information for IP multicast distribution of MBMS user plane data.

Different vehicle to everything (V2X) messages can be transmitted by being distributed to different areas having the same TMGI.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G communication system is an evolution of the LTE-A.

For clarity, the following description will focus on LTE-A. However, technical features of the present invention are not limited thereto.

Figure 1:
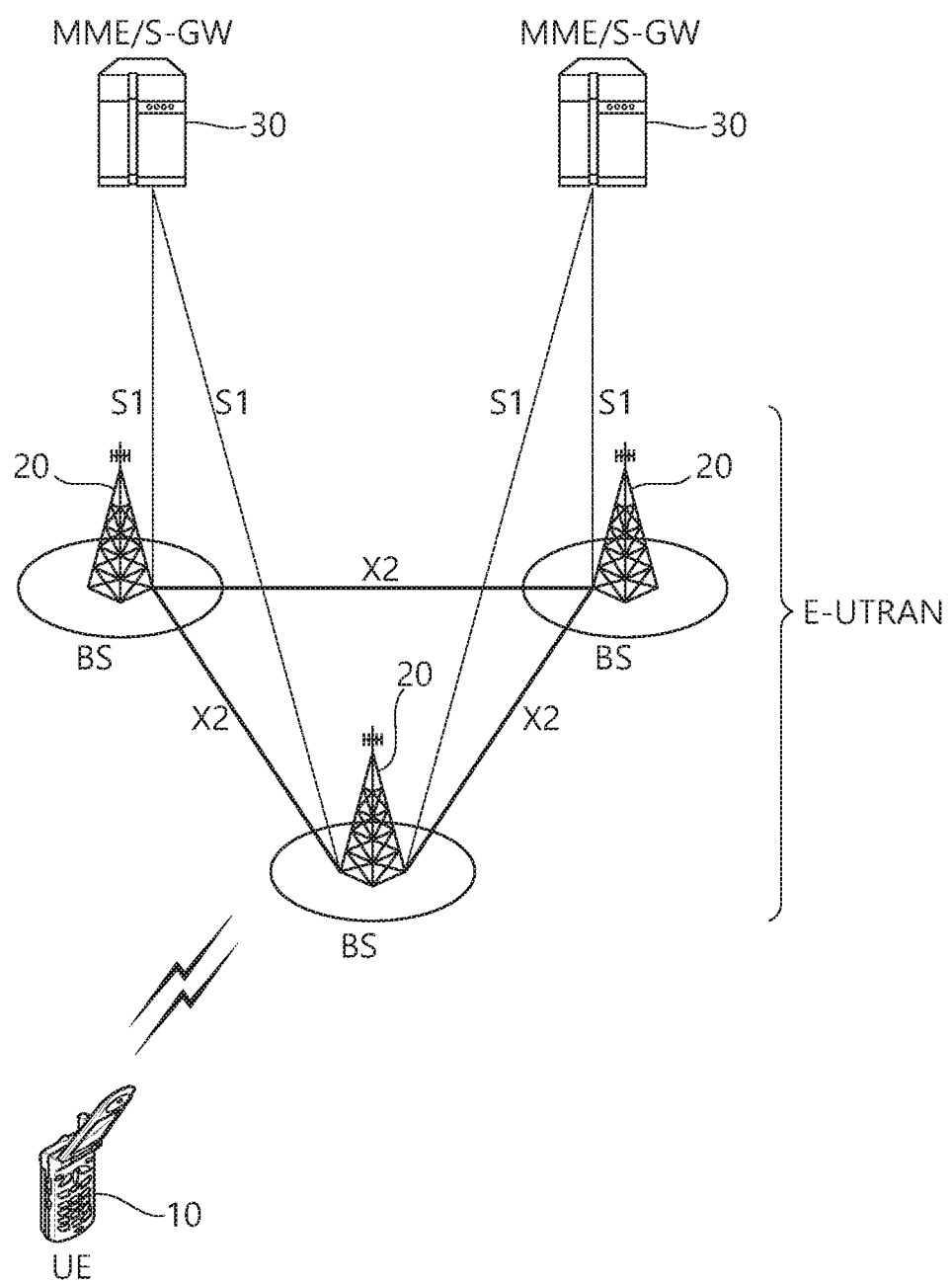
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-

GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
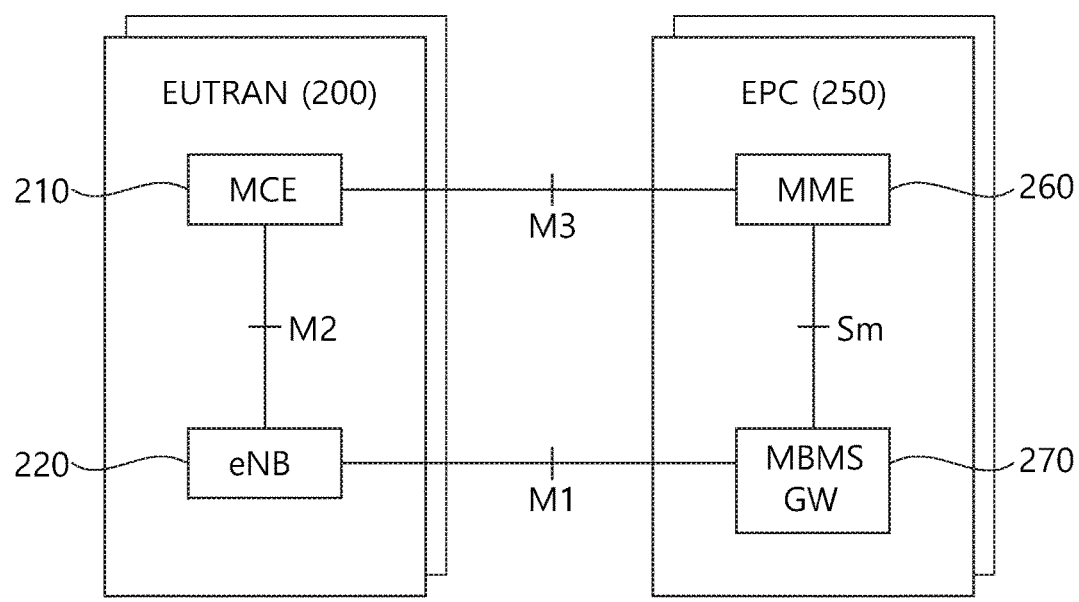
FIG. 2 shows a network architecture of an MBMS.

FIG. 2 shows a network architecture of an MBMS.

Referring to FIG. 2, the radio access network (EUTRAN, 200) includes a multi-cell coordination entity (hereinafter, "MCE", 210) and a base station (eNB, 220). The MCE 210 is a main entity for controlling the MBMS and plays a role to perform session management, radio resource allocation or admission control of the base station 220. The MCE 210 may be implemented in the base station 220 or may be implemented independent from the base station 220. The interface between the MCE 210 and the base station 220 is called M2 interface. The M2 interface is an internal control plane interface of the radio access network 200 and MBMS control information is transmitted through the M2 interface. In case the MCE 210 is implemented in the base station 220, the M2 interface may be present only logically.

The EPC (Evolved Packet Core, 250) includes an MME 260 and an MBMS gateway (GW) 270. The MBMS gateway 270 is an entity for transmitting MBMS service data and is positioned between the base station 220 and the BM-SC and performs MBMS packet transmission and broadcast to the base station 220. The MBMS gateway 270 uses a PDCP and IP multicast to transmit user data to the base station 220 and performs session control signaling for the radio access network 200.

The interface between the MME 260 and the MCE 210 is a control plane interface between the radio access network 200 and the EPC 250 and is called M3 interface. Control information related to MBMS session control is transmitted through the M3 interface. The MME 260 and the MCE 210 transmits, to the base station 220, session control signaling such as a session start/stop message for session start or session stop, and the base station 220 may inform the UE through a cell notification that the corresponding MBMS service has been started or stopped.

The interface between the base station 220 and the MBMS gateway 270 is a user plane interface and is called M1 interface.

Figure 3:
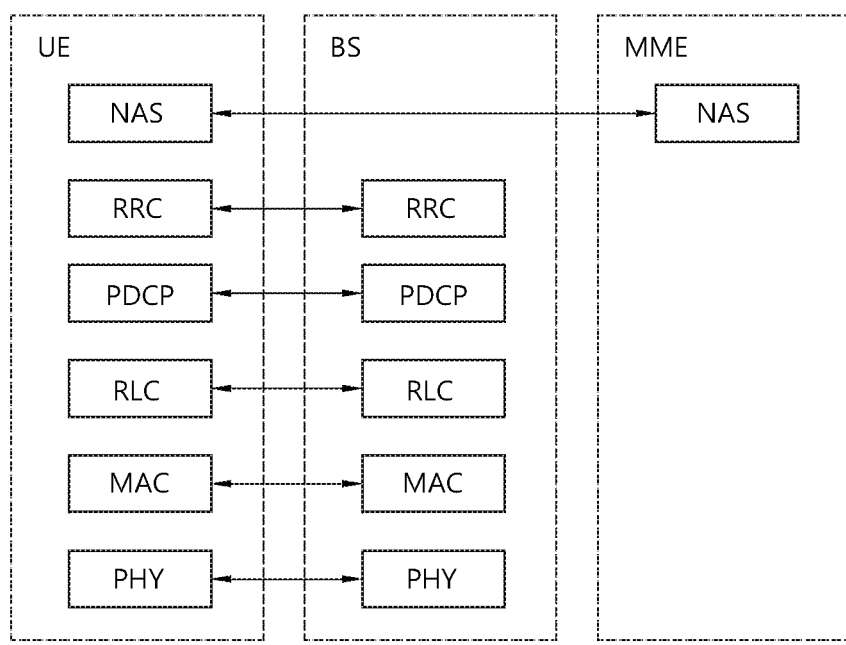
FIG. 3 shows a control plane and a user plane of a radio interface protocol of an LTE system.
Figure 3:
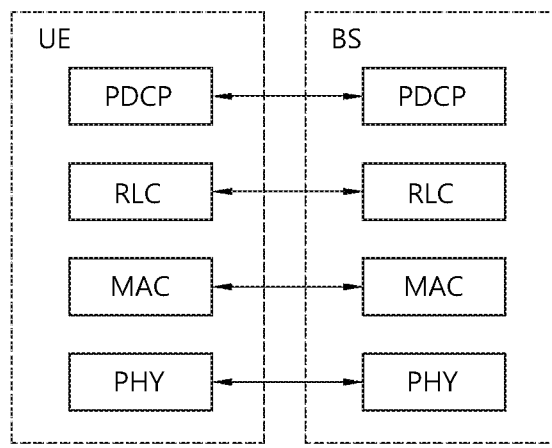

FIG. 3 shows a control plane and a user plane of a radio interface protocol of an LTE system. FIG. 3A shows a control plane of a radio interface protocol of an LTE system. FIG. 3B shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

Referring to FIG. 3A, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3B, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, RRC state of the UE and RRC connection method are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell reselection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED state, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successful, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE announces the location of the UE to the network through a tracking area update procedure.

Hereinafter, an MBMS and a multicast/broadcast signal frequency network (MBSFN) will be described.

MBSFN transmission or MBSFN-mode transmission implies a simultaneous transmission scheme implemented by transmitting the same signal at the same time in a plurality of cells. MBSFN transmission from the plurality of cells in an MBSFN area is regarded by a UE as single transmission.

An MBMS service may be subjected to cell-based or geography-based management or localization. An MBMS service area is a term referring to an area in which a specific MBMS service is provided. For example, if an area in which a specific service A is performed is referred to as the MBMS service area A, a network may be in a state of transmitting the MBMS service A in the MBMS service area A. In this case, the UE may receive the MBMS service A according to capability of the UE. The MBMS service area may be defined in terms of an application and service regarding whether a specific service is provided in a specific area or not.

A multicast control channel (MCCH) or a multicast traffic channel (MTCH) may be mapped to a multicast channel (MCH) which is a transmission channel for the MBMS. The MCCH transmits an MBMS-related RRC message, and the MTCH transmits traffic of a specific MBMS service. One MCCH exists for one MBMS single frequency network (MBSFN) for transmitting the same MBSM information/traffic, and if a plurality of MBSFN areas are provided in one cell, the UE may receive a plurality of MCCHs. The MCCH has a list of all MBMS services by including one MBSFN area configuration RRC message. If the MBMS-related RRC message is modified in a specific MCCH, a physical downlink control channel (PDCCH) transmits an MBMS radio network temporary identity (M-RNTI) and an indication indicating the specific MCCH. A UE supporting the MBMS may receive the M-RNTI and the MCCH indication through the PDDCH to recognize that the MBMS-related RRC message has been modified in the specific MCCH, and may receive the specific MCCH. The RRC message of the MCCH may be modified in every modification period, and is repetitively broadcast in every modification period. A notification mechanism is used to notify an MCCH modification caused by the start of an MCCH session or the existence of an MBMS counting request message. The UE detects the MCCH modification which is notified without depending on the notification mechanism through MCCH monitoring at the modification period. The MTCH is a logical channel on which the MBMS service is carried, and a plurality of MTCHs may be configured if there are many services provided in the MBSFN area.

The UE may receive a dedicated service during the MBMS service is received. For example, while a certain user watches TV through an MBMS service by using a smart-phone of the user, the user can perform chatting through an instant message (IM) service such as MSN or Skype by using the smart-phone. In this case, the MBMS service is provided through an MTCH received together by several UEs, and a service individually provided to each UE similarly to the IM service is provided through a dedicated bearer such as DCCH or DTCH.

In one area, a certain eNB may use several frequencies at the same time. In this case, in order to effectively use a radio resource, a network may select one of the several frequencies to provide an MBMS service at that frequency, and may provide a dedicated bearer to each UE at all frequencies. In this case, if a UE which receives a service by using a dedicated bearer at a frequency at which the MBMS service is not provided desires to receive the MSMB service, the UE needs to be handed over to a frequency at which the MBMS is provided. For this, the UE transmits an MBMS interest indication to the eNB. That is, the UE transmits the MBMS interest indication to the eNB when desiring to receive the MBMS service, and the eNB recognizes that the UE desires to receive the MBMS service upon receiving the indication, and thus moves the UE to the frequency at which the MBMS is provided. Herein, the MBMS interest indication implies information indicating that the UE desires to receive the MBMS service, and additionally includes information regarding to which frequency it desires to move.

A UE which desires to receive a specific MBMS service recognizes frequency information and broadcast time information for providing the specific service. If the MBMS service has already been broadcasting or is going to be broadcast soon, the UE sets a top priority to the frequency at which the MBMS service is provided. The UE performs a cell reselection procedure by using re-configured frequency priority information, and thus receives the MBMS service by moving to the cell for providing the MBMS service.

If the UE is receiving the MBMS service or is interested in receiving it or is capable of receiving the MBS service while camping on the frequency at which the MBMS service is provided, in a situation where a reselected cell is broadcasting system information block 13 (SIB13), it may be considered that a top priority is applied to a corresponding frequency during the MBMS service as long as the following situation is continued.

When SIB15 of a serving cell indicates that one or more MBMS service area identities (SAIs) are included in user service description (USD) of a corresponding service.

When the SIB15 is not broadcast in the serving cell, and the corresponding frequency is included in the USD of the corresponding service.

The UE needs to be capable of performing MBMS reception in RRC_IDLE and RRC_CONNECTED states.

Hereinafter, a device-to-device (D2D) operation is described.

In 3GPP LTE-A, a service related to the D2D operation is called a proximity service (ProSe). Now, the ProSe is described. Hereinafter, the ProSe is the same concept as the D2D operation, and the ProSe and the D2D operation may be used without distinction. The ProSe includes ProSe direction communication and ProSe direct discovery.

The ProSe direct communication is communication performed between two or more proximate UEs. The UEs may perform communication by using a protocol of a user plane. A ProSe-enabled UE implies a UE supporting a procedure related to a requirement of the ProSe. Unless otherwise specified, the ProSe-enabled UE includes both of a public safety UE and a non-public safety UE. The public safety UE is a UE supporting both of a function specified for a public safety and a ProSe procedure, and the non-public safety UE is a UE supporting the ProSe procedure and not supporting the function specified for the public safety.

ProSe direct discovery is a process for discovering another ProSe-enabled UE adjacent to ProSe-enabled UE. In this case, only the capabilities of the two types of ProSe-enabled UE are used. EPC-level ProSe discovery means a process for determining, by an EPC, whether the two types of ProSe-enabled UE are in proximity and notifying the two types of ProSe-enabled UE of the proximity. Hereinafter, for convenience, the ProSe direct communication may be referred to as D2D communication, and the ProSe direct discovery may be referred to as D2D discovery.

Hereinafter, a radio resource assignment for ProSe direct communication.

ProSe-enabled UE may use the following two types of mode for resource assignment for ProSe direct communication.

1) Mode 1: Mode 1 is mode in which resources for ProSe direct communication are scheduled by an eNB. UE needs to be in the RRC_CONNECTED state in order to send data in accordance with mode 1. The UE requests a transmission resource from an eNB. The eNB performs scheduling assignment and schedules resources for sending data. The UE may send a scheduling request to the eNB and send a ProSe Buffer Status Report (BSR). The eNB has data to be subjected to ProSe direct communication by the UE based on the ProSe BSR and determines that a resource for transmission is required.

2) Mode 2: Mode 2 is mode in which UE directly selects a resource. UE directly selects a resource for ProSe direct communication in a resource pool. The resource pool may be configured by a network or may have been previously determined. Meanwhile, if UE has a serving cell, that is, if the UE is in the RRC_CONNECTED state with an eNB or is placed in a specific cell in the RRC_IDLE state, the UE is considered to be placed within coverage of the eNB. If UE is placed outside coverage, only mode 2 may be applied. If the UE is placed within the coverage, the UE may use mode 1 or mode 2 depending on the configuration of an eNB. If another exception condition is not present, only when an eNB performs a configuration, UE may change mode from mode 1 to mode 2 or from mode 2 to mode 1.

Figure 4:
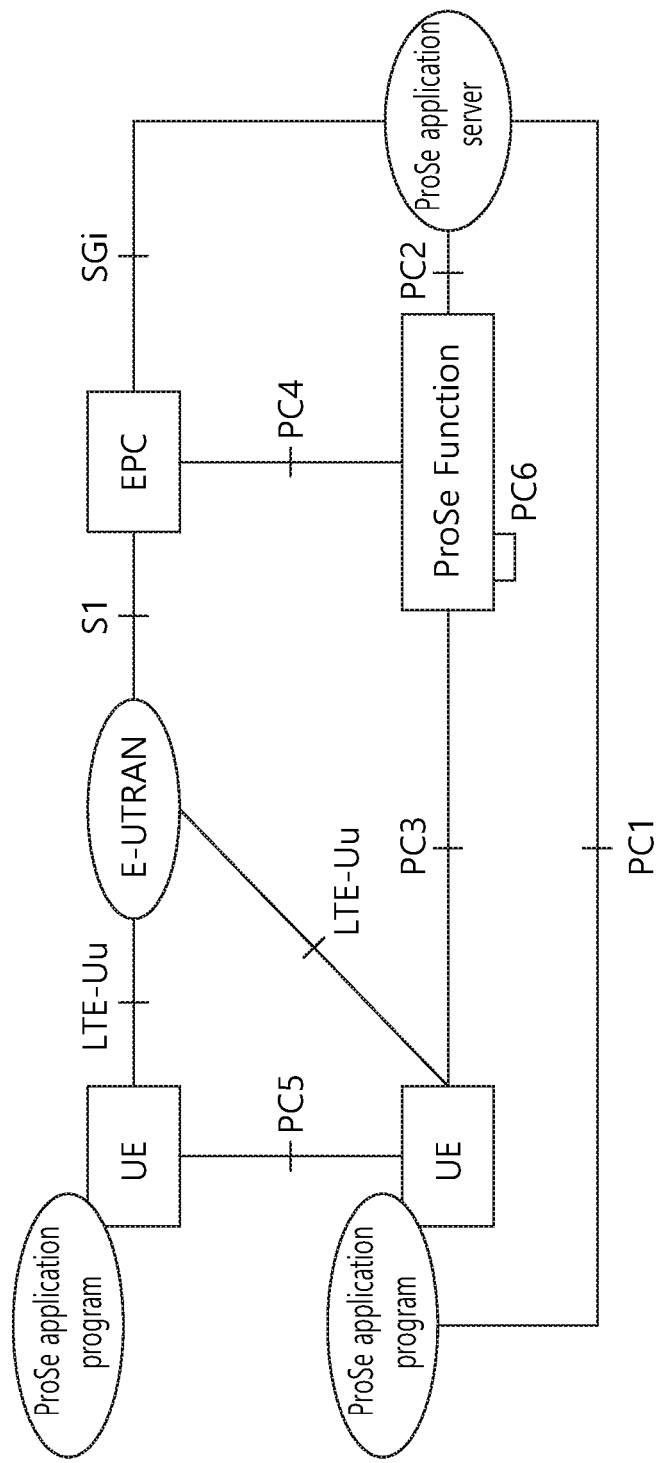
FIG. 4 shows a basic structure for ProSe.

FIG. 4 shows a basic structure for ProSe.

Referring to FIG. 4, the basic structure for ProSe includes an E-UTRAN, an EPC, a plurality of types of UE including a ProSe application program, a ProSe application server (a ProSe APP server), and a ProSe function. The EPC represents an E-UTRAN core network configuration. The EPC may include an MME, an S-GW, a P-GW, a policy and charging rules function (PCRF), a home subscriber server (HSS) and so on. The ProSe APP server is a user of a ProSe capability for producing an application function. The ProSe APP server may communicate with an application program within UE. The application program within UE may use a ProSe capability for producing an application function.

The ProSe function may include at least one of the followings, but is not necessarily limited thereto.

Interworking via a reference point toward the 3rd party applications

Authorization and configuration of UE for discovery and direct communication

Enable the functionality of EPC level ProSe discovery

ProSe related new subscriber data and handling of data storage, and also handling of the ProSe identities Security related functionality Provide control towards the EPC for policy related functionality Provide functionality for charging (via or outside of the EPC, e.g., offline charging)

Hereinafter, a reference point and a reference interface in the basic structure for ProSe are described.

PC1: a reference point between the ProSe application program within the UE and the ProSe application program within the ProSe APP server. This is used to define signaling requirements in an application dimension.

PC2: a reference point between the ProSe APP server and the ProSe function. This is used to define an interaction between the ProSe APP server and the ProSe function. The update of application data in the ProSe database of the ProSe function may be an example of the interaction.

PC3: a reference point between the UE and the ProSe function. This is used to define an interaction between the UE and the ProSe function. A configuration for ProSe discovery and communication may be an example of the interaction.

PC4: a reference point between the EPC and the ProSe function. This is used to define an interaction between the EPC and the ProSe function. The interaction may illustrate the time when a path for 1:1 communication between types of UE is set up or the time when ProSe service for real-time session management or mobility management is authenticated.

PC5: a reference point used for using control/user plane for discovery and communication, relay, and 1:1 communication between types of UE.

PC6: a reference point for using a function, such as ProSe discovery, between users belonging to different PLMNs.

SGi: this may be used to exchange application data and types of application dimension control information.

Hereinafter, vehicle to everything (V2X) communication is described.

Figure 5:
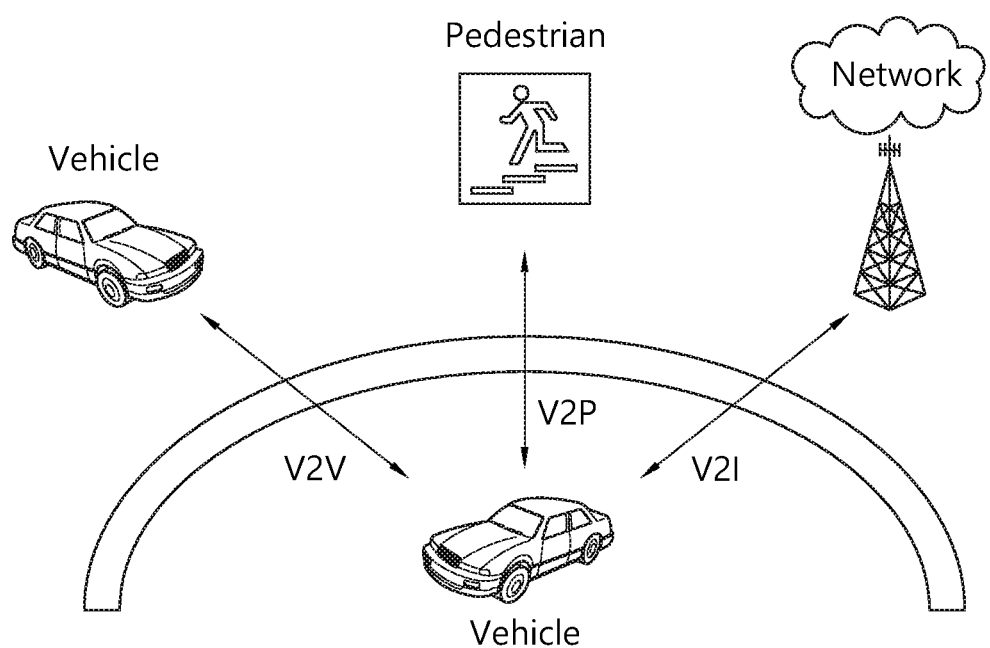
FIG. 5 shows a vehicle to everything (V2X) communication environment.

FIG. 5 shows a V2X communication environment.

V2X is a technology which adds mobility to a D2D technology to exchange or share useful information such as traffic conditions or the like by mutually communicating with road infrastructure or other vehicles persistently while a vehicle is travelling. A connectivity functions is applied to some types of vehicles, and with an advance in a communication function, there is ongoing research for supporting vehicle-to-vehicle (V2V) communication, vehicle-to-infrastructure (V2I) communication, vehicle-to-pedestrian (V2P) communication, and vehicle-to-network (V2N) communication.

According to the V2X communication, the vehicle persistently broadcasts information regarding its location, speed, direction, or the like. Upon receiving the broadcast information, a neighboring vehicle recognizes a movement of neighboring vehicles and utilizes this to prevent accidents. That is, a UE having a specific shape may be installed in each vehicle similarly to a case where an individual user has a UE having a shape of a smart phone, a smart-watch, or the like. In this case, the UE installed in the vehicle is a device for receiving a communication service in practice in a communication network. For example, the UE installed in the vehicle may receive the communication service by accessing an eNB in E-UTRAN.

Meanwhile, several terms to be used in the specification described below will be first defined before the proposed V2X communication method is described.

road side unit (RSU): As an entity for supporting V2I communication, it means an entity capable of performing transmission to a UE and reception from the UE by using a V2I application. The RSU may be implemented in an eNB or a UE (in particular, a stationary UE). The eNB or UE operating as the RSU collects information regarding traffic safety (e.g., traffic light information, traffic volume information, etc.) and/or a movement of neighboring vehicles, and transmits information to another UE for which V2I communication will be performed or receives information from another UE.

V2I communication: As one type of V2X communication, an RSU and UE using the V2I application are subjects of communication.

V2N communication: As one type of V2X communication, a serving entity and UE using a V2N application are subjects of communication, and the UE and the serving entity communicate with each other through an LTE network entity.

V2P communication: As one type of V2X communication, two UEs using a V2P application are subjects of communication.

V2V communication: As one type of V2X communication, two UEs using a V2V application are subjects of communication. It is different from the V2P communication in a sense that any one UE is a UE of a pedestrian in the V2P communication, whereas any one UE is a UE of a vehicle in the V2V communication.

Un interface: It means an interface between a relay node and an eNB. It means an interface used in transmission/reception achieved in an MBSFN(MBMS(Multimedia Broadcast/Multicast Services) over Single Frequency Network) subframe.

PC5 interface: It means an interface used in direct communication between two UEs, and is an interface used in communication between devices supporting a proximity service (ProSe).

Hereinafter, a localized MBMS will be described.

In an MBMS system, a BM-SC, an MBMS-GW, and an MME may be located in a core network. When calculating an end-to-end delay, in particular, when an MBMS is used to forward a downlink V2X packet in a V2X system, a backhaul delay between the BS-SC and an eNB cannot be ignored. Options described below may be necessary to minimize the delay.

First option: An MBMS CN function (e.g., BM-SC, MBMS-GW) is moved to be close to the eNB, or is co-located with the eNB.

Second option: A user plane of the MBMS CN function (e.g., BM-SC, MBMS-GW) is moved to be close to the eNB, or is co-located with the eNB.

Various location options may be considered to minimize the V2X delay.

Figure 6:
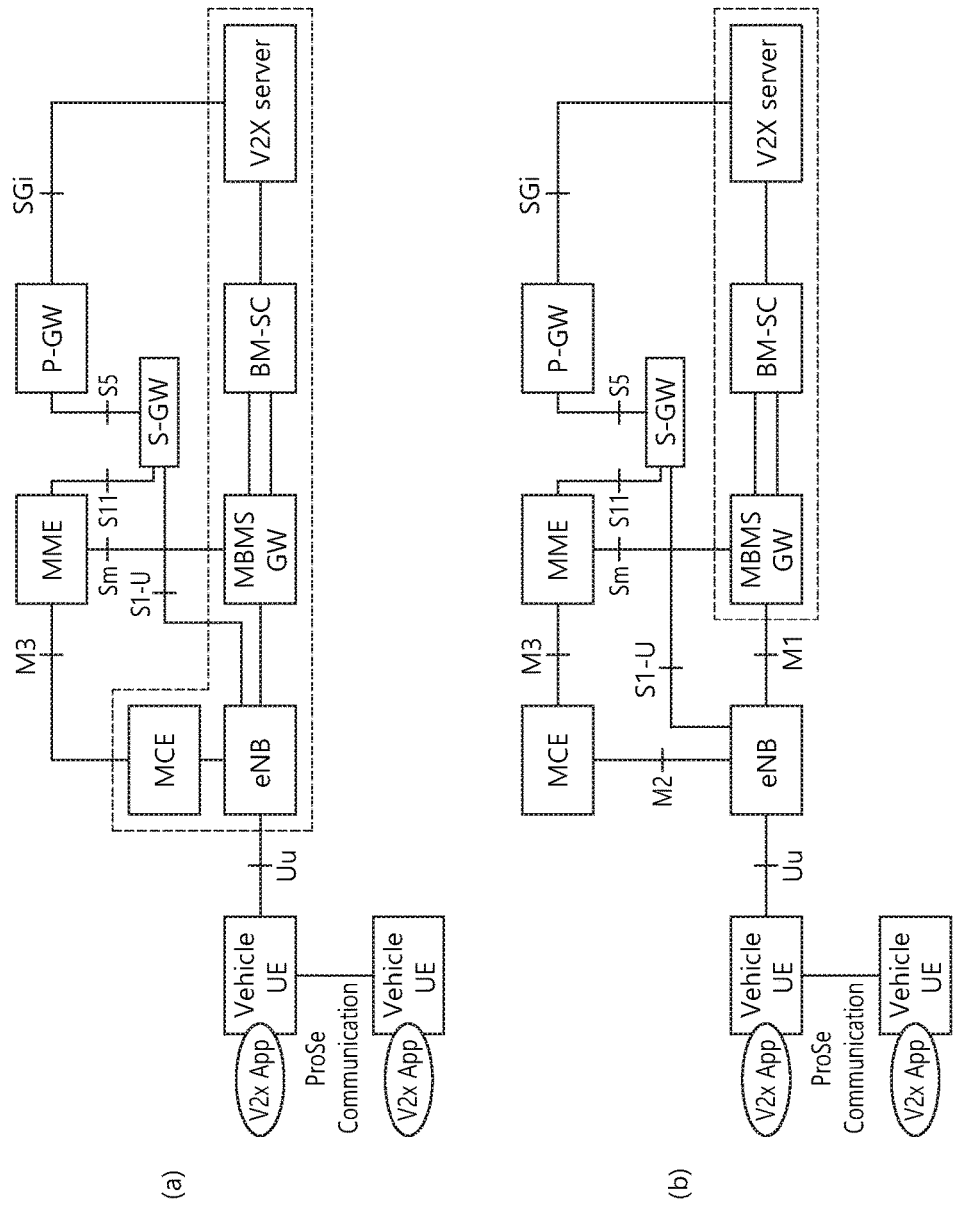
FIG. 6 shows a localized V2X server and multimedia broadcast multicast service (MBMS).

FIG. 6 shows a localized V2X server and MBMS. Specifically, FIG. 6(a) shows a localized V2x server and MBMS co-located with an eNB, and FIG. 6(b) shows a localized V2X server and MBMS not co-located with the eNB.

Referring to FIG. 6(a), the V2X server, a BM-SC, and an MBMS GW may be all co-located with the eNB. Since all user plane interfaces are located inside, the V2X delay can be minimized. Referring to FIG. 6(b), the V2X server, a BM-SC, and an MBMS GW are all co-located, but may not be co-located with the eNB. This physical node may forward V2X traffic to several eNBs.

Figure 7:
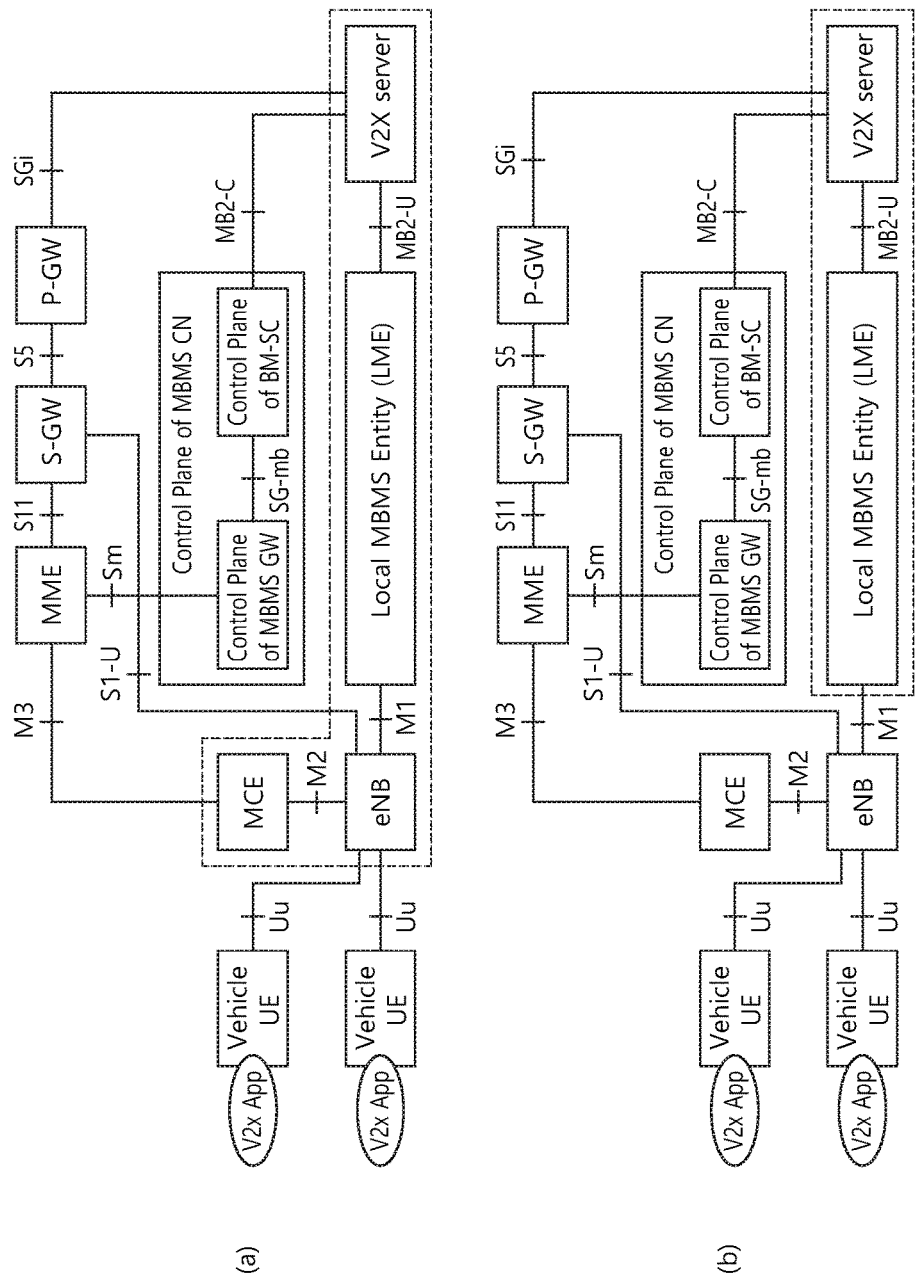
FIG. 7 shows a localized V2X server and local MBMS entity (LME).

FIG. 7 shows a localized V2X server and local MBMS entity (LME). Specifically, FIG. 7(a) shows a localized V2X server and LME co-located with an eNB, and FIG. 7(b) shows a localized V2X server and LME not co-located with the eNB.

Referring to FIG. 7(a), the V2X service and the LME including a user plane of an MBMS CN function may be all located in the eNB. A V2X message may be forwarded in a cell served by a hosting eNB. Since all user plane interfaces are located inside, a V2X delay can be minimized. Referring to FIG. 7(b), the V2X server and the LME including a user plane of an MBMS CN function are all co-located together, but may not be co-located with the eNB. A V2X message may be delivered in a cell served by several eNBs.

When the MBMS CN function (e.g., BM-SC, MBMS GW) is moved to be close to the eNB, the number of eNBs that can be covered by the MBMS CN function may be decreased. For example, in case of a local MBMS network scenario in which the MBMS CN function is located to be close to the eNB, the number of eNBs that can be covered by the MBMS CN function may be less than that of a typical MBMS network scenario.

Figure 8:
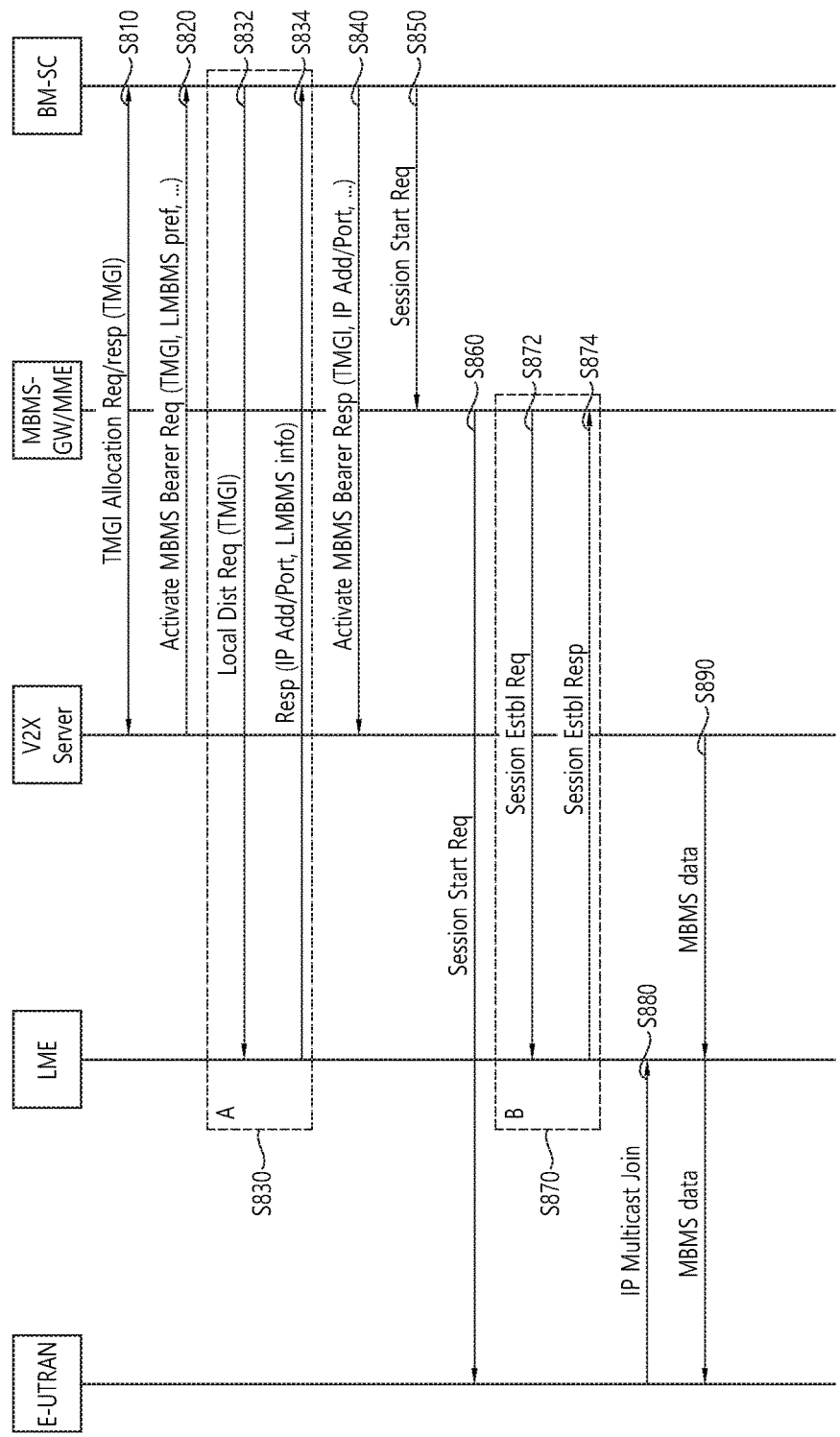
FIG. 8 shows a procedure of forwarding local MBMS data through an LME.

FIG. 8 shows a procedure of forwarding local MBMS data through an LME.

Referring to FIG. 8, depending on whether the IP address and the IP Multicast Address are allocated by LME or by the BM-SC/MBMS-GW, steps in Box A (option A) or Box B (option B) are performed.

In step S810, V2X Server requests a TMGI via MB2-C.

In step S820, V2X Server initiates Activation MBMS Bearer Request procedure. The message may include an indication of V2X Server preference for local delivery.

In step S830, if the IP address and the IP Multicast Address are allocated by LME (option A):

In step S832, BM-SC is preconfigured with LME information (e.g. FQDN or IP address for the LME). When BM-SC decides to establish local delivery path for V2X message, the BM-SC initiates Local Distribution Request procedure with the LME. This message includes TMGI as an identifier. This is initiated over a new interface "Mv" between BM-SC and LME.

In step S834, the LME replies with the Local Distribution Response message including the IP address/port in LME for receiving the data, and the associated information of Local MBMS Distribution, e.g., IP Source Address, and IP Multicast Address in LME for IP multicast distribution. In LME, it is 1:1 mapping between the IP address/port for receiving the data, and the associated IP source address/IP Multicast address.

In step S840, BM-SC provides the local MBMS information needed for transmission of V2X message to LME, e.g. IP address and port, to V2X Server in the Activate MBMS Bearer Response message. The IP address and port can be obtained via the step S830 from LME, or it can be pre-configured in BM-SC.

In step S850, BM-SC initiates MBMS Session Start procedure. The MBMS Session Start Request message includes the information of Local MBMS Distribution if it is obtained from the step S830. Upon the reception of the information of Local MBMS Distribution, the MBMS-GW will skip the normal processing for IP multicast distribution, e.g. allocate an IP multicast address.

In step S860, The MBMS-GW uses the received Local MBMS Distribution information in the MBMS Session Start Request message, and sends it to MME, which is forwarded to eNB/MCE.

In step S870, If Local MBMS Distribution information (i.e. IP source address and IP Multicast Address) is not received from BM-SC in the step S850 (option B):

In step S872, The MBMS-GW sends a Session Establishment Request message including the session attributes (TMGI, Flow Identifier, transport network IP Multicast Address(es), IP address(es) of the multicast source, C-TEID, IP address and port number . . . ) to the LME.

In step S874, The LME responds with a Session Establishment Response message.

In step S880, The eNB joins the IP Multicast group, which is one in the LME.

In step S890, V2X Server sends the V2X Data via the IP/port address received from the step S840.

When different V2X messages are provided to different areas, if one TMGI is 1:1 mapped to one area, a box A (option A) may be used among the procedures described above in FIG. 8. However, for different areas having the same TMGI, the different V2X message cannot be transmitted by using the procedure of the box A. That is, according to the procedure described above, the different V2X messages cannot be transmitted by being distributed to different areas having the same TMGI. Further, according to a box B (option B) among the procedures described above in FIG. 8, since a broadcast multicast service center (BM-SC) does not provide an MBMS-GW with information related to the LME, the MBMS-GW cannot know to which LME a session establishment request message is transmitted.

Figure 9:
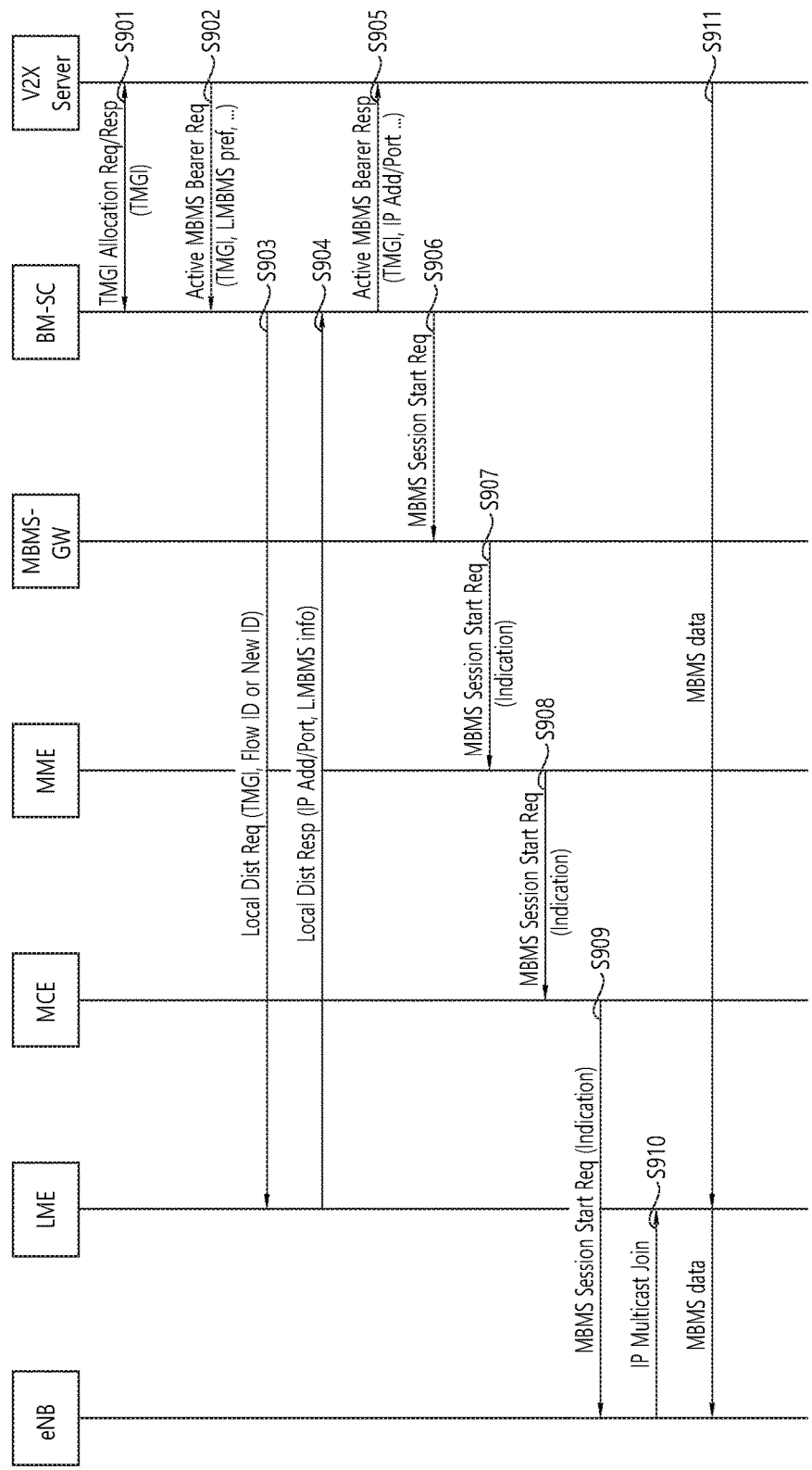
FIG. 9 shows a procedure for transmitting different V2X messages to different areas having the same TMGI according to an embodiment of the present invention.

FIG. 9 shows a procedure for transmitting different V2X messages to different areas having the same TMGI according to an embodiment of the present invention.

Referring to FIG. 9, in step S901, a V2X server may request the TMGI through an MB2-C.

In step S902, the V2X server may transmit an activation MBMS bearer request message to a BM-SC. The activation MBMS bearer request message may include an indication of a V2X server preference for a local delivery.

In step S903, the BM-SC may be pre-configured with LME information. For example, the LME information may be fully qualified domain name (FQDN) or an IP address for the LME. When the BM-SC determines to establish a local delivery path, the BM-SC may transmit a local distribution request message to an LME. The local distribution request message may include a TMGI as an identifier. In addition, the local distribution request message may include a flow ID or a new ID. The flow ID or the new ID may be used to identify different data content when a network intends to provide different data in different areas using the same TMGI. Transmission of the local distribution request message may start through a new interface between the BM-SC and the LME. The new interface may be an Mv interface.

In step S904, the LME may transmit a local distribution response message to the BM-SC in response to the local distribution request message. The local distribution response message may include information related to an IP address/port of the LME for receiving data and the local MBMS distribution. For example, the local distribution response message may include at least any one of a C-TEID allocated by the LME on the basis of the flow ID or new ID received in step S903, an IP address of one or more multicast sources, and one or more transport network IP multicast addresses.

In step S905, the BM-SC may provide the V2X server with local MBMS information required for transmission of the V2X message. For example, the local MBMS information may be a port or IP address of the LME. The local MBMS information may be provided to the V2X server by being included in an activation MBMS bearer response message.

In step S906, the BM-SC may start an MBMS session start procedure. That is, the BM-SC may transmit an MBMS session start request message to the MBMS-GW. The MBMS session start request message may include information regarding the local MBMS distribution acquired in step S904.

In step S907, if the MBMS-GW receives the information regarding the local MBMS distribution, the MBMS-GW may skip a typical procedure for IP multicast distribution. For example, the MBMS-GW may not allocate the C-TEID, the IP address of the multicast source, or the transport network IP multicast address. The MBMS-GW may transmit the MBMS session start request message to the MME. The MBMS session start request message may include an indication for notifying whether the information regarding the local MBMS distribution is allocated by the LME. The information regarding the local MBMS distribution may be information for the IP multicast distribution of MBMS user plane data. In the present specification, information regarding the local MBMS distribution, information related to the local MBMS, information regarding the IP multicast distribution, and information for the IP multicast distribution of the MBMS user plane data may be used in the same concept.

For example, if the indication is included in the MBMS session start request message, the MME may know that the information regarding the local MBMS distribution is allocated by the LME. On the other hand, if the indication is not included in the MBMS session start request message, the MME may know that the information regarding the local MBMS distribution is not allocated by the LME. In this case, the information regarding the local MBMS distribution may be information allocated by the BM-SC.

For example, if the indication included in the MBMS session start request message indicates that the information regarding the local MBMS distribution is allocated by the LME, the MME may know that the information regarding the local MBMS distribution is allocated by the LME. On the other hand, if the indication included in the MBMS session start request message indicates that the information regarding the local MBMS distribution is not allocated by the LME, the MME may know that the information regarding the local MBMS distribution is not allocated by the LME. In this case, the information regarding the local MBMS distribution may be information allocated by the BM-SC.

In step S908, upon receiving the indication from the MBMS-GW, the MME may forward the indication to the MCE. The indication may be forwarded to the MCE by using the MBMS session start request message including the information regarding the local MBMS distribution.

In step S909, if the MCE receives the indication from the MME, the MCE may convey the indication to an eNB. The indication may be conveyed to the eNB by using the MBMS session start request message including the information regarding the local MBMS distribution.

In step S910, if the eNB receives the indication from the MCE, the eNB may distinguish whether the information regarding the local MBMS distribution is allocated by the LME. That is, the eNB may determine whether the information for the IP multicast distribution of the MBMS user plane data is allocated by the LME on the basis of the indication. On the basis of the received information, the eNB may join the transport network IP multicast address allocated by the LME so that the V2X message can be received.

In step S911, the V2X server may transmit the V2X message to the eNB through the IP/port address received in step S905.

According to the procedure proposed in FIG. 9, the BM-SC may provide an identity to the LME, and as a result, the V2X server may transmit different messages to different areas using the same TMGI. In addition, the MBMS-GW may provide the eNB an indication for distinguishing whether the information regarding the IP multicast distribution is allocated by the LME through the MME and the MCE. Therefore, if the information regarding the IP multicast distribution is allocated by the LME, the eNB may know that a packet without an MBMS key is transmitted to the UE. If the information regarding the IP multicast distribution is allocated by the LME, the packet without the MBMS key is transmitted to the UE because the LME does not support an MBMS security function. When the eNB knows that the packet without the MBMS key is transmitted to the UE, the eNB may perform an operation of, for example, additionally providing secondary information for security to the UE. Further, if the information regarding the IP multicast distribution is allocated by the LME, the MCE for managing a resource of the eNB may know that the information regarding the IP multicast distribution is allocated by the LME through the indication, and may allocate a resource to the eNB so that the V2X message is provided more rapidly to the UE than the MBMS-GW.

Figure 10:
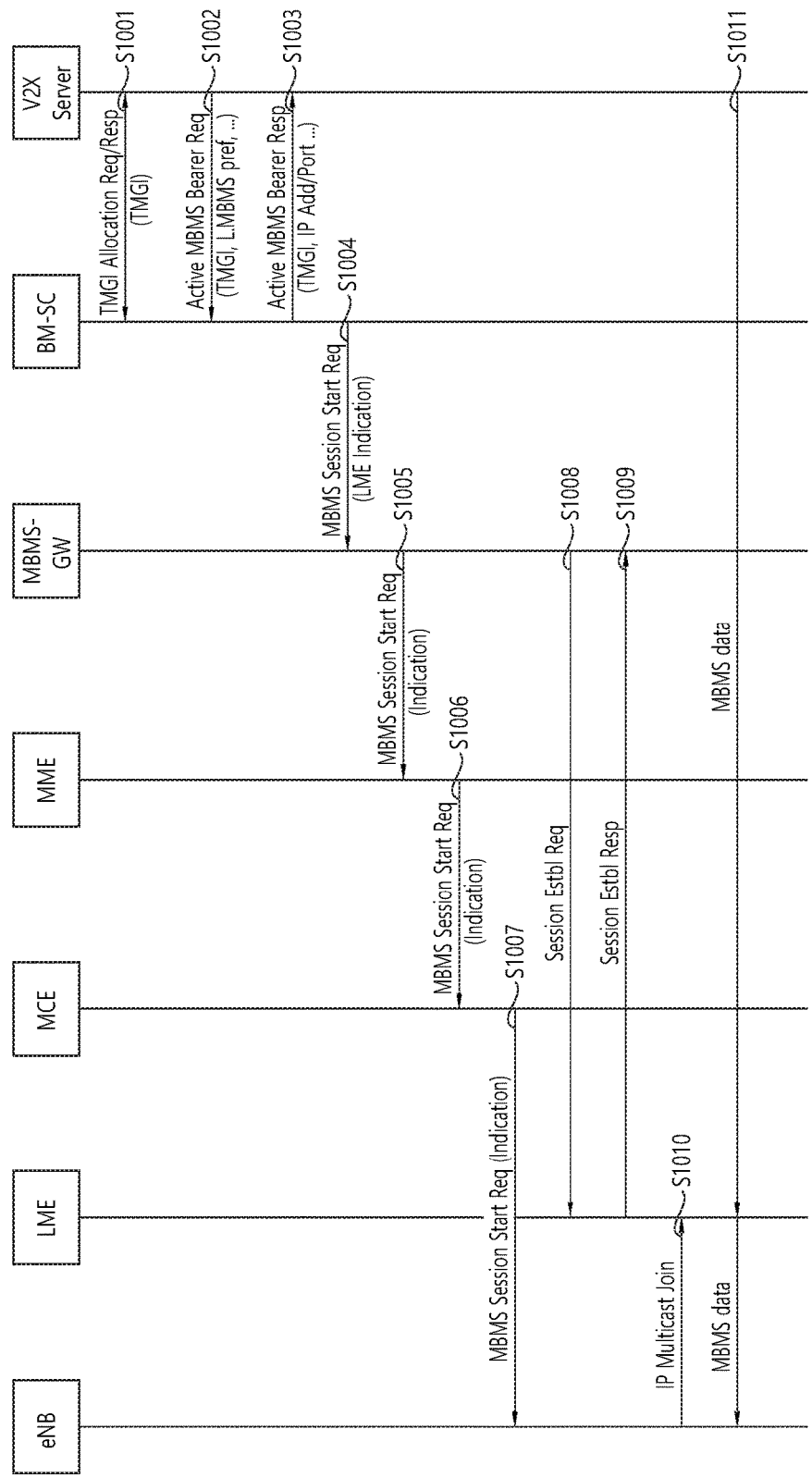
FIG. 10 shows a procedure for transmitting different V2X messages to different areas having the same TMGI according to an embodiment of the present invention.

FIG. 10 shows a procedure for transmitting different V2X messages to different areas having the same TMGI according to an embodiment of the present invention.

Referring to FIG. 10, in step S1001, a V2X server may request the TMGI through an MB2-C.

In step S1002, the V2X server may transmit an activation MBMS bearer request message to a BM-SC. The activation MBMS bearer request message may include an indication of a V2X server preference for a local delivery.

In step S1003, the BM-SC may provide the V2X server with local MBMS information required for transmission of the V2X message. For example, the local MBMS information may be a port or IP address of the LME. The local MBMS information may be provided to the V2X server by being included in an activation MBMS bearer response message. The port and IP address may be pre-configured in the BM-SC.

In step S1004, the BM-SC may start an MBMS session start procedure. That is, the BM-SC may transmit an MBMS session start request message to the MBMS-GW. The MBMS session start request message may include an LME indication. The LME indication may allow the MBMS-GW to trigger a session establishment procedure to a proper LME. If the MBMS-GW is connected to a plurality of LMEs, the LME indication may include an ID of the LME. Alternatively, if the MBMS-GW is connected to the plurality of LMEs, the LME indication may include a port and IP address of the selected LME.

In step S1005, if the MBMS-GW receives the information regarding the local MBMS distribution, the MBMS-GW may skip a typical procedure for IP multicast distribution. For example, the MBMS-GW may not allocate the C-TEID, the IP address of the multicast source, or the transport network IP multicast address. The MBMS-GW may transmit the MBMS session start request message to the MME. The MBMS session start request message may include an indication for notifying whether the information regarding the local MBMS distribution is allocated by the LME. The information regarding the local MBMS distribution may be information for the IP multicast distribution of MBMS user plane data. Detailed descriptions for the indication may refer to step S907 of FIG. 9.

In step S1006, upon receiving the indication from the MBMS-GW, the MME may forward the indication to the MCE. The indication may be forwarded to the MCE by using the MBMS session start request message including the information for the IP multicast distribution.

In step S1007, if the MCE receives the indication from the MME, the MCE may convey the indication to an eNB. The indication may be conveyed to the eNB by using the MBMS session start request message including the information for the IP multicast distribution. If the eNB receives the indication from the MCE, the eNB may distinguish whether the information for the IP multicast distribution is allocated by the LME. That is, the eNB may determine whether the information for the IP multicast distribution of the MBMS user plane data is allocated by the LME on the basis of the indication.

In step S1008, the MBMS-GW may transmit a session establishment request message to the LME on the basis of the LME indication received in step S1004. The session establishment request message may include at least any one of a TMGI, a flow identifier (ID), one or more transport network IP multicast addresses, an IP address of one or more multicast sources, a C-TEID, and an IP address/port number.

In step S1009, the LME may respond with a session establishment response message.

In step S1010, on the basis of the received information, the eNB may join the transport network IP multicast address allocated by the LME so that the V2X message can be received.

In step S1011, the V2X server may transmit the V2X message to the eNB through the IP/port address received in step S1003.

According to the procedure proposed in FIG. 10, the BM-SC may provide an LME indication to the MBMS-GW, and as a result, the MBMS-GW may know to which LME the session establishment request message is to be transmitted. In addition, the MBMS-GW may provide the eNB an indication for distinguishing whether the information regarding the IP multicast distribution is allocated by the LME through the MME and the MCE.

Figure 11:
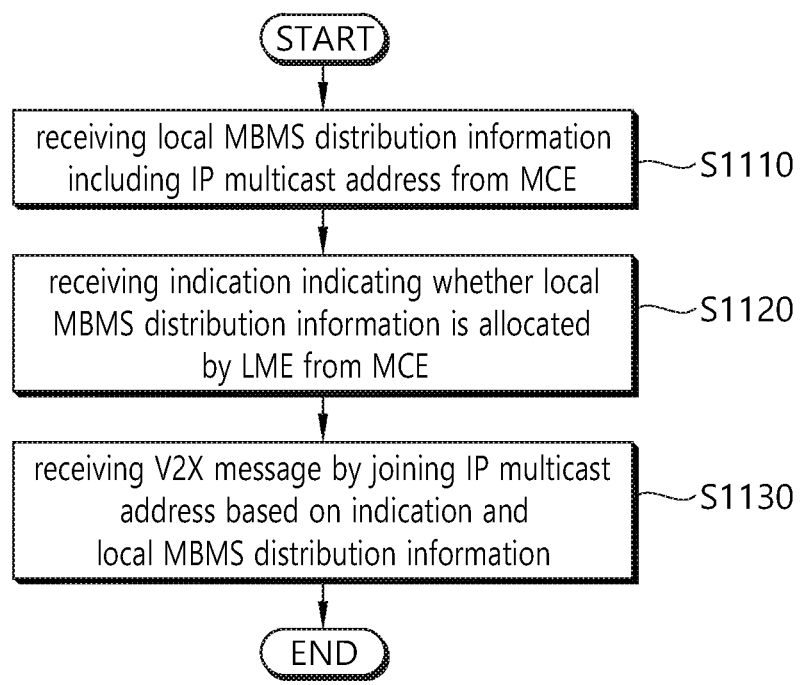
FIG. 11 is a block diagram showing a method in which an eNB receives a V2X message according to an embodiment of the present invention.

FIG. 11 is a block diagram showing a method in which an eNB receives a V2X message according to an embodiment of the present invention.

Referring to FIG. 11, in step S1110, the eNB may receive local multicast broadcast multicast service (MBMS) distribution information including an internet protocol (IP) multicast address from a multi-cell coordination entity (MCE). The local MBMS distribution information may be information for the IP multicast distribution of MBMS user plane data.

The IP multicast address may be an IP multicast address in the LME.

The IP multicast address may include a transport network IP multicast address and an IP address of a multicast source.

The local MBMS distribution information may be allocated by the LME on the basis of a flow identity (ID) for identifying different data. The flow ID may be transmitted from a broadcast multicast service center (BM-SC) to the LME by being included in a local distribution request message. The flow ID may be transmitted from the BM-SC to the LME only when a network provides different data to a different area by using the same TMGI.

The local MBMS distribution information may further include a common tunnel endpoint identifier (C-TEID).

In step S1120, the eNB may receive from the MCE an indication for indicating whether the local MBMS distribution information is allocated by a local MBMS entity (LME). In addition, the eNB may check whether the local MBMS distribution information is allocated by the LME on the basis of the indication.

The indication may indicate that the local MBMS distribution information is allocated by the LME.

The indication and the local MBMS distribution information may be received from the MCE by being included in an MBMS session start request message.

In step S1130, the eNB may receive the V2X message by joining the IP multicast address on the basis of the indication and the local MBMS distribution information. The V2X message is received by joining the IP multicast address included in the local MBMS distribution information allocated by the LME when the base station checks that the local MBMS distribution information is allocated by the LME.

Figure 12:
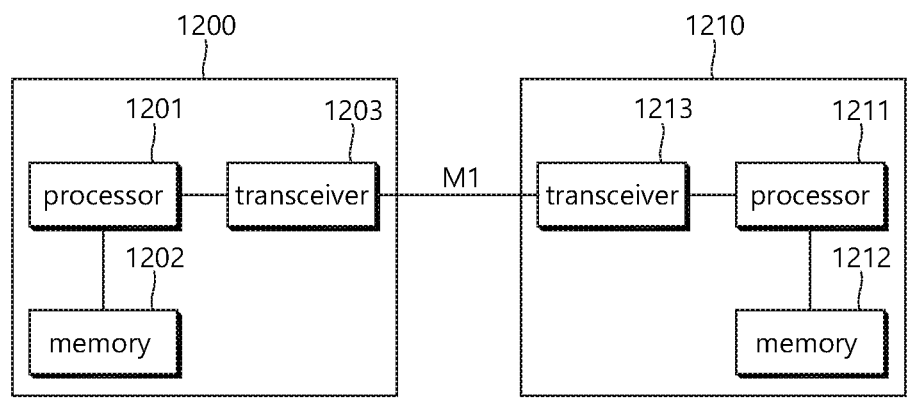
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

An LME 1210 includes a processor 1211, a memory 1212 and a transceiver 1213. The memory 1212 is connected to the processor 1211, and stores various information for driving the processor 1211. The transceiver 1213 is connected to the processor 1211, and transmits and/or receives radio signals. The processor 1211 implements proposed functions, processes and/or methods. In the above embodiment, an operation of the LME may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings on the basis of the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method of receiving a vehicle to everything (V2X) message by a base station (BS) in a wireless communication system, the method comprising:
   receiving, from a multi-cell coordination entity (MCE), local multimedia broadcast multicast service (MBMS) distribution information, the local MBMS distribution information being allocated by a local MBMS entity (LME) based on a flow identity (ID) for identifying different V2X messages,
   wherein the local MBMS distribution information for internet protocol (IP) multicast distribution of MBMS user plane data includes an IP multicast address;
   receiving, from the MCE, information informing the BS that the local MBMS distribution information is allocated by the LME
   based on the received information, determining that the local MBMS distribution information is allocated by the LME; and
   based on the received information and the local MBMS distribution information, joining the IP multicast address and receiving the V2X message,
   wherein the flow ID for identifying the different V2X messages is transmitted from a broadcast multicast service center (BM-SC) to the LME, when the different V2X messages are provided to different areas having a same temporary mobile group identifier (TMGI).

2. The method of claim 1, wherein the BS determines that the local MBMS distribution information is allocated by the LME, when the BS receives the information.

3. The method of claim 2, wherein the V2X message is received by joining the IP multicast address included in the local MBMS distribution information allocated by the LME when the BS determines that that the local MBMS distribution information is allocated by the LME.

4. The method of claim 1, wherein the IP multicast address is an IP multicast address in the LME.

5. The method of claim 1, wherein the IP multicast address includes a transport network IP multicast address and an IP address of a multicast source.

6. The method of claim 1, wherein the flow ID is included in a local distribution request message.

7. The method of claim 1, wherein the local MBMS distribution information further includes a common tunnel endpoint identifier (C-TEID).

8. The method of claim 1, wherein the information and the local MBMS distribution information are received from the MCE by being included in an MBMS session start request message.

9. A base station of receiving a vehicle to everything (V2X) message in a wireless communication system, the base station comprising:
   a memory; a transceiver; and
   a processor, operatively coupled to the memory and the transceiver, wherein the processor is configured to:
      control the transceiver to receive local multimedia broadcast multicast service (MBMS) distribution information, the local MBMS distribution information being allocated by a local MBMS entity (LME) based on a flow identity (ID) for identifying different V2X messages being allocated by a local MBMS entity (LME) based on a flow identity (ID) for identifying different V2X messages, from a multi-cell coordination entity (MCE),
      wherein the local MBMS distribution information for internet protocol (IP) multicast distribution of MBMS user plane data includes an IP multicast address;
      control the transceiver to receive information informing the BS that the local MBMS distribution information is allocated by the LME, from the MCE;
      based on the received information, determine that the local MBMS distribution information is allocated by the LME; and
      based on the received information and the local MBMS distribution information controls the transceiver to join the IP multicast address and receive the V2X message,
      wherein the flow ID for identifying the different V2X messages is transmitted from a broadcast multicast service center (BM-SC) to the LME, when the different V2X messages are provided to different areas having a same temporary mobile group identifier (TMGI).

10. The BS of claim 9, wherein the processor is configured to determine that the local MBMS distribution information is allocated by the LME, when the transceiver receives the information.

11. The BS of claim 9, wherein the V2X message is received by joining the IP multicast address included in the local MBMS distribution information allocated by the LME, when the processor determine that the local MBMS distribution information is allocated by the LME.

12. The BS of claim 9, wherein the IP multicast address is an IP multicast address in the LME.

13. The BS of claim 9, wherein the IP multicast address includes a transport network IP multicast address and an IP address of a multicast source.

* * * * *